(12) United States Patent
Robertson

(10) Patent No.: US 6,636,867 B2
(45) Date of Patent: Oct. 21, 2003

(54) METHOD OF ENABLING AND ADMINISTERING COMMERCIAL TRANSACTIONS USING A COMPUTERIZED ADMINISTRATION SYSTEM

(76) Inventor: Gavin Charles George Robertson, 41 Albury Street, London, SE8 3ET (GB)

( * ) Notice: Subject to any disclaimer, the term of this patent is extended or adjusted under 35 U.S.C. 154(b) by 425 days.

(21) Appl. No.: 09/766,490

(22) Filed: Jan. 19, 2001

(65) Prior Publication Data

US 2002/0099711 A1 Jul. 25, 2002

(51) Int. Cl.[7] .............................................. G06F 17/30
(52) U.S. Cl. ............................ 707/104; 705/57; 705/59
(58) Field of Search .............................. 707/104, 1, 3, 707/6, 9, 10; 705/57, 59, 53, 50

(56) References Cited

U.S. PATENT DOCUMENTS

| | | | | |
|---|---|---|---|---|
| 5,671,412 A | * | 9/1997 | Christiano | 707/104.1 |
| 6,189,146 B1 | * | 2/2001 | Misra et al. | 717/177 |
| 6,289,341 B1 | * | 9/2001 | Barney | 707/6 |
| 6,385,596 B1 | * | 5/2002 | Wiser et al. | 705/51 |

* cited by examiner

Primary Examiner—Sanjiv Shah
(74) Attorney, Agent, or Firm—Luedeka, Neely & Graham P.C.

(57) ABSTRACT

The present invention relates to a method of enabling and administering commercial transactions using a computerised administration system. The method comprises (with reference to FIG. 1)storing in a first computer database (13) of the computerised administration system (12) records of a plurality of recordings of sounds and/or images and/or text together with records of a plurality of holders of intellectual property rights in or related to the recordings; storing in a second computer database (16) of the computerised administration system (12) records of agreements concluded between the holders of the intellectual property rights and a plurality of suppliers licensed under the intellectual property rights, the suppliers producing a variety of different types of products deliverable to customers under the agreements; making first (13) and second (16) the computer databases accessible via a telecommunications network to prospective purchasers of the products of the suppliers; and enabling the purchasers to search the first (13) and second (16) computer databases to locate for each recording which supplier can produce each type of product licensed by the relevant holder of intellectual property rights.

22 Claims, 3 Drawing Sheets

METHOD OF ENABLING AND ADMINISTERING COMMERCIAL TRANSACTIONS USING A COMPUTERIZED ADMINISTRATION SYSTEM

The present invention relates to a method of enabling and administering commercial transactions using a computerised administration system, in particular commercial transactions relating to the sale of recordings of sounds and/or images and/or text. The present invention also relates to an administration system for implementing the method.

The present invention has particular relevance to recordings of music, but is equally applicable to other recordings in which intellectual property rights exist.

In the music industry there are number of smaller record companies which are called "independent record labels". These independent record labels have difficulty in competing with the larger multinational record companies. The smaller record companies have difficulty in obtaining comparable terms with e.g. compact disk manufacturers, sellers of digital downloads or providers of pay-for-play services. The independent record labels also have difficulty in obtaining the same commercial terms with distributors.

The costs of infrastructure for independent record labels such as payment administration systems and records of agreements can be prohibitive for independent record labels.

It is quite common for retailers to establish web sites on the Internet, and indeed some retailers trade only on the Internet. Their websites offer consumers the opportunity to purchase for instance books, compact disks, CD ROMS, or to purchase digital downloads of, for instance, music.

Electronic retailers have not found it easy to purchase sound recordings or the rights to digitally distribute sound recordings of independent record labels. For a start, there is the problem of knowing who produces products for the independent record labels. In this respect, it should be understood that an independent label will not itself produce compact disks but instruct a compact disk manufacturer to produce the goods on its behalf. Also, it is unlikely that an independent record label will invest in the technology necessary to deliver digital files containing music. Instead, the independent record label will contract a supplier to supply the digital files on its behalf. To date it has been difficult for the electronic retailers easily to ascertain how to obtain product when they receive an order from a consumer or product for stock to sell to a consumer.

The present invention provides in a first aspect a method of enabling and administering commercial transactions, the method comprising the steps of:

storing in a computer database records of a plurality of recordings of sounds and/or images and/or text together with records of a plurality of holders of intellectual property rights in or related to the recordings;

storing in the computer database records of agreements concluded between the holders of the intellectual property rights and a plurality of suppliers licensed to use the intellectual property rights, the suppliers producing a variety of different types of products deliverable to consumers under the agreements;

making the computer database accessible via a telecommunications network to purchasers who may wish to purchase the products produced by the suppliers; and enabling the purchasers to search the database to ascertain for each recording which supplier is licensed to produce each type of product.

The present invention provides in a second aspect a method of enabling and administering commercial transactions using a computerised administration system, the method comprising the steps of:

a plurality of holders of Intellectual Property rights in a plurality of recordings of sounds and/or images and/or text offering the recordings for sale on a plurality of sites hosted on a plurality of host computer apparatus and publicly accessible from a telecommunications network;

a purchaser using client computer apparatus to order electronically via the telecommunications network recordings from the plurality of different sites of the holders of Intellectual Property rights;

each host computer apparatus relaying details regarding the orders of the purchaser to a payment administration system common to all the publicly accessible sites and contained in the computerised administration system;

the purchaser making a single electronic payment via the telecommunications network to the payment administration system in respect of orders made placed by the purchaser at a plurality of different publicly accessible sites;

storing in a first computer database of the computerised administration system records of the plurality of recordings of sounds and/or images and/or text offered for sale by the holders of the Intellectual Property rights holders;

storing in a second computer database of the computerised administration system records of agreements concluded between the holders of the Intellectual Property rights and a plurality of suppliers licensed under the Intellectual Property rights; and the computerised administration system using the first and second databases thereof to determine from the orders placed by the purchaser which suppliers are authorised to supply the requested recordings and to relay electronically via the telecommunications network the orders to the relevant suppliers along with payment for the orders.

It should be understood that in the context of the invention purchasers will include electronic retailers ordering products for delivery to the end consumer as well as other music users such as broadcasters and juke box operators.

Preferred embodiments of the present invention will now be described with reference to the accompanying drawings in which.

There are three main facets to the administration system:

- a database which holds both records of Intellectual Property Rights and of deals/agreements made between holders of Intellectual Property Rights and various suppliers;
- a brokerage system which allows agreements to be concluded on-line between holders of Intellectual Property Rights and suppliers/users;
- and an application server system which serves applications to a community of Intellectual Property Rights Holders.

The three facets will be discussed in turn, starting with the database.

Database

Figure 1:
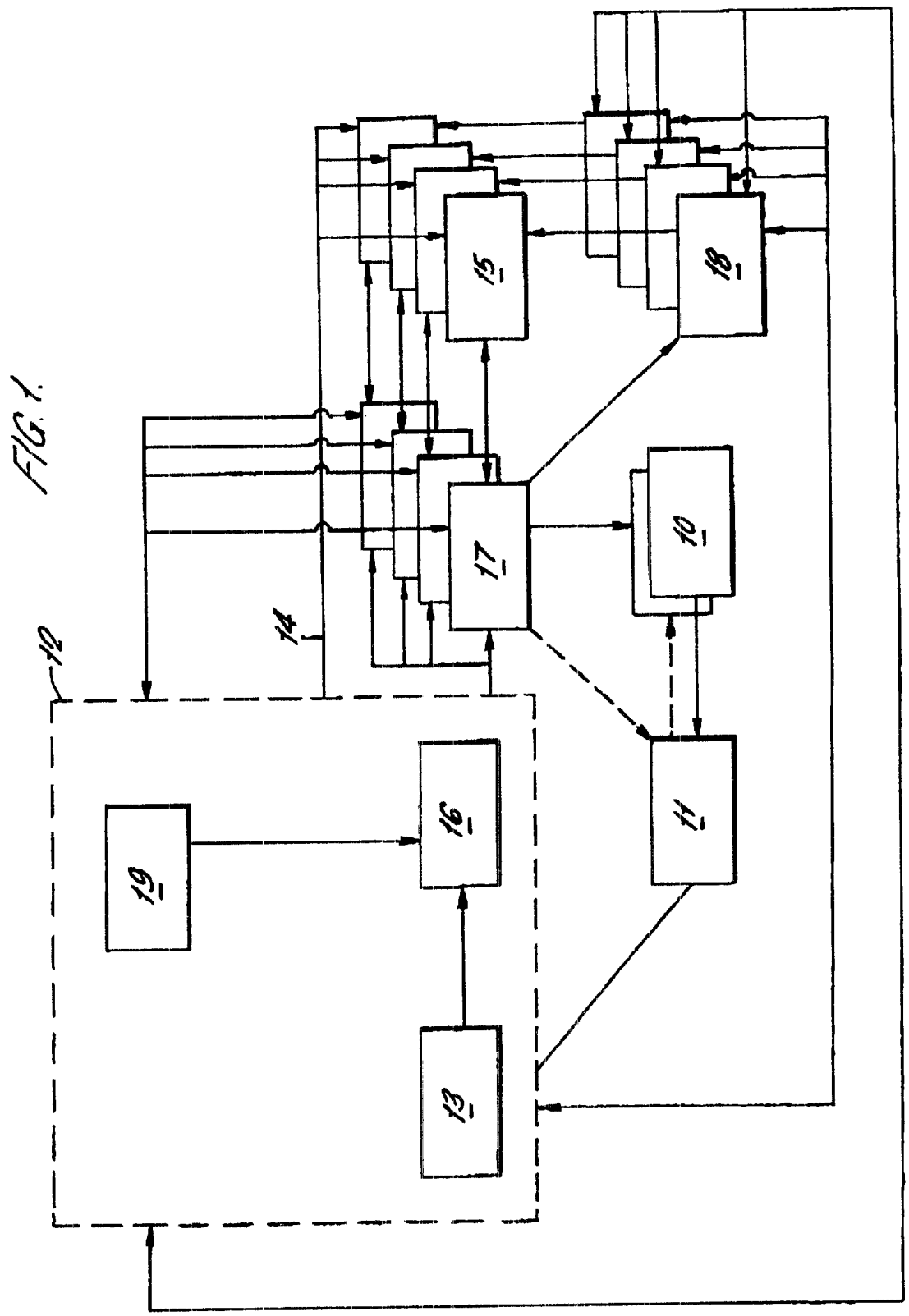
FIG. 1 shows schematically an administration system according to a first embodiment of the present invention.

In FIG. 1 there can be seen a consumer who would typically use a personal computer 10 and web browser software on the personal computer 10 to access via a telecommunications network, for instance the Internet, a site (e.g. a website) of a retailer on computer apparatus 11.

The retailer in the example will offer to sell to the consumer recordings of music. The consumer will be able to use his web browser to access the website of the retailer and to select from the retailer's website one or more musical recordings for purchase. The consumer typically purchases the recordings using a credit card, in a known manner.

Once the consumer has ordered from the retailer the delivery of a musical recording, the retailer must then source and deliver the musical recording to the consumer.

In a first example the consumer orders a compact disk from the retailer. Traditionally the retailer may hold stocks of compact disks for immediate despatch to consumers. However, this has worked to the detriment of independent record labels, because the retailers will tend to stock compact disks of known and established artists, because it is likely that they will sell quickly. Therefore, the retailer does not have to hold a stock for a considerable period. Occasionally, record companies have agreed to supply compact disks to retailers who then pay for the compact disks only when they are sold to the consumer. For an independent record label the investment in supplying compact disks on a sale or return basis may prove prohibitive.

In the method of the present invention the retailer does not itself hold stocks of compact disks of independent record labels. Instead, on receipt of an order from a consumer the retailer uses the computer apparatus 11 to access a database 13 stored on computer apparatus 12 of an administrator. In the preferred embodiment, the administrator will be the headquarters organisation of a community such as an association whose members are the independent record label. The administrator will have a site accessible by a telecommunications network. In the preferred embodiment the site is a website accessible by the Internet. The website will allow access to the computer database 13. It is envisaged that the access will be limited so that the retailers will have controlled access (e.g. a password) before they are allowed access and before they can transact business.

In the computer database 13 there will be records of information regarding musical recordings. It is envisaged that the computer database 13 will record information per musical track. This information will typically comprise the name of the relevant artist, the name of the relevant independent record label, the title of the track and a unique identifying number. For each track the record in the computer database 13 will also include a link to a master copy of the musical track. This can be seen in FIG. 1 by the link 14 which links the computer apparatus 12 with a plurality of archive databases 15 which contain the master recordings.

The computer apparatus 12 will also support a database 16 containing records of agreements concluded between the independent record labels and various product suppliers. For instance, an independent record label for a particular musical track may license a first supplier to supply compact disks by mail order, a second supplier to supply digital sound files (e.g. MP3 files) via the Internet and a third supplier to run a pay per play service which allows consumers to hear musical recordings without downloading the recordings for storage on local hard drives. The independent record labels may also, for a particular artist, license a first supplier to sell T-shirts bearing the name of the artist, a second supplier to supply mugs bearing the name of the artist and a third supplier to supply printed matter relating to the artist. Details of the agreements between the independent record label and all of the suppliers will be recorded in the database 16.

When a retailer receives an order from the consumer for say a compact disk recording of a musical track called "Sparrow" of the musical band called "Flamingo" (hypothetical names) the retailer will use the computer apparatus 11 to access the computer database 13 and will search using the artist's name and compact disk name. The retailer will then be able to access in database 16 details of agreements concluded in respect of the "Sparrow" musical track and thereby discover that a particular supplier 17 has been licensed by the independent record label to supply the relevant compact disk. It is envisaged that the computer database 12 will automatically connect the computer apparatus 11 of the retailer with computer apparatus 17 of the relevant supplier and the retailer will then electronically place an order with the supplier, who will then subsequently deliver, according to the agreement between retailer and supplier, e.g. by delivering the ordered compact disk directly to the consumer. Alternatively, a supplier might use the computer apparatus 17 thereof to deliver a digital file via the telecommunications network directly to the computer apparatus 10 of the consumer (as shown in FIG. 1).

Another possibility would be for the supplier to use its computer apparatus 17 to send a digital file to the computer apparatus 11 of the retailer who would then send the file onwards via the telecommunications network to the computer apparatus 10 of the consumer. This shown by the dotted lines in FIG. 1.

It is envisaged that the retailer will use the computer apparatus 11 to transfer payment electronically to the computer apparatus 17 of the supplier. The supplier will subsequently transfer a royalty payment electronically to the relevant independent record label by sending a message to the computer apparatus 18 of the relevant independent record label. Alternatively, the payment transaction could be administered by the administrator who will have records in database 16 of how monies should be divided between the Intellectual Property Rights holders and the suppliers (this function might be conducted e.g. by a bank operating as an agent of the administrator). In a further variation the administrator could use the computer apparatus 12 to record transactions passed to the suppliers with tis record being used by the IP Rights holders to calculate invoices for royalties.

The supplier will have access to the master sound recording, either directly or the supplier can be linked to the master copy by using the computer apparatus 17 to access the computer database 13.

The suppliers provide a fulfilment service, in that they are able to fulfill orders on behalf of the independent record label.

In the example above, the supplier by agreement produces compact disks containing musical recordings and then sells the compact disks. Another supplier licensed by the independent record label may sell product electronically by selling digital files of music, e.g. MP3 files. In this case the supplier 17 will probably need to access the master copy of the sound recording on a regular basis, converting the master copy into a format deliverable to the consumer 10.

It is envisaged that the administrator who runs the computerised administration system 12 will be a collective community such as an association or trade body of Intellectual Property Rights holders, which represents the interests of a plurality of different independent record labels. Information regarding the musical recordings of all of the independent record labels will be recorded on the database 13 and the database 13 will also be used to record information regarding agreements between all of the independent record labels and relevant suppliers.

Brokerage System

In its second facet the system provides on-line brokering of agreements between Intellectual Property Rights holders and suppliers. It is envisaged that the collective will negotiate on behalf of all of the independent record labels with a number of suppliers. The association by acting on behalf of a number of different independent record labels, will be able to obtain better terms from the suppliers than the independent record labels would be able to do on their own. Once the terms and conditions of an agreement have been agreed between the association and the suppliers then these terms and conditions will be recorded on a brokerage database 19. The independent record labels using a plurality of computer apparatus 18 will be able to access the computer database 19, which will be password-protected, to access the standard terms and conditions which have been agreed. The independent record labels using the plurality of computer apparatus 18 will then be able to select which of the standard agreements with suppliers are suitable and preferable for the business of independent record labels. This selection will most likely be made on a track by track basis, although there will be facility for block allocation of tracks to a particular agreement. The independent record label will select agreements electronically by sending electronic signals from one of the plurality of computer apparatus 18 (e.g. a personal computer) to the computer database 19. The computer database 19 will then automatically inform the relevant supplier of the fact that the independent record label has signed up to an agreement with it on the pre-agreed terms and conditions, by making the information electronically available (either via an e-mail or by inclusion on a web page) to the computer apparatus 17 of the supplier. The computer database 19 will automatically forward to the database 16 a record of each concluded agreement.

In the event that a retailer uses computer apparatus 11 to access the computer database 12 and does not find that a supplier has been licensed to supply a particular product, the computer database 12 will act to refer the retailer directly to the relevant independent record label, e.g. by directing the retailer to a website on the Internet. Thus the retailer can make contact directly with the independent record label to enquire how a product may be purchased.

Whilst above the method has described how a consumer may purchase via a retailer some products, it is also envisaged that the method would be suitable for circumstances where the purchaser of the product is a broadcaster or an advertiser. The broadcaster or advertiser could obtain a licence to broadcast the recorded music or use the recorded music in an advertisement. Standard licence terms could be agreed between the administrator and the broadcasters and advertisers on behalf of the independent record labels. The independent record labels could perhaps on a track by track basis sign up to the standard licence terms. Alternatively or additionally the independent record labels could themselves conclude specific agreements, perhaps on a track by track basis, with advertisers or broadcasters and details of these agreements could be recorded in the computer database 12. To facilitate this it is envisaged that the broadcaster or advertiser could have direct access to the master copy of the sound recording stored in the archives 15 and the links stored in the computer database 12 would facilitate this. An individual contract could be assembled from templates made available by the administration computer apparatus 12, or adapted from such templates.

Applications Server System

In a third facet the system provides, for example, an applications server 21 serving computer program applications to the independent record labels. Also, the system could provide an applications server 21 serving royalty management, financial management, marketing software or e-commence. In one embodiment it is envisaged that payment processing could take place electronically by a centralised administration system run by the administrator on behalf of both of the independent record labels and the suppliers. This would enable a customer (e.g. a retailer, a broadcaster, a juke-box operator, a consumer) to access the system 12 and place a bulk order for several different products supplied by several different suppliers under agreements with several different independent record labels. The computer administration system 12 will be configured to receive the orders from the customer, determine which suppliers are appropriate, send the orders electronically on to the relevant suppliers, accept payment from the customer and then apportion to the suppliers. By having access to the database 16 of agreements the computer system 12 could make the appropriate allocations of payment in each case. The payments could be transferred to the suppliers electronically via the telecommunications network. This could happen, for instance, at monthly intervals.

It is envisaged that the retailers may themselves conclude special agreements with the suppliers and/or the independent record labels. Special discounted prices could for instance be agreed. Such agreements could be included in the store 16 of agreements and if this is the case then when an order from a retailer is relayed to a supplier the supplier will receive electronic notification of the existence of the agreement so that the correct payment will be requested/made. Alternatively, if the computer database acts by linking the computer apparatus of the retailer directly to the computer apparatus of the supplier, this linking process will include the step of ensuring that the supplier is reminded of the special purchasing agreement. Should centralised processing of payments be part of the method (as described above), then the special purchasing arrangements can be accommodated even more readily by the computer apparatus processing the payment.

The computer system 12 would enable the independent record labels to share common "shopping cart" and financial clearance computer system supported by the computer system 12. Such computer system could be licensed via agreements brokered by the brokering system. This is illustrated in FIG. 2.

Figure 2:
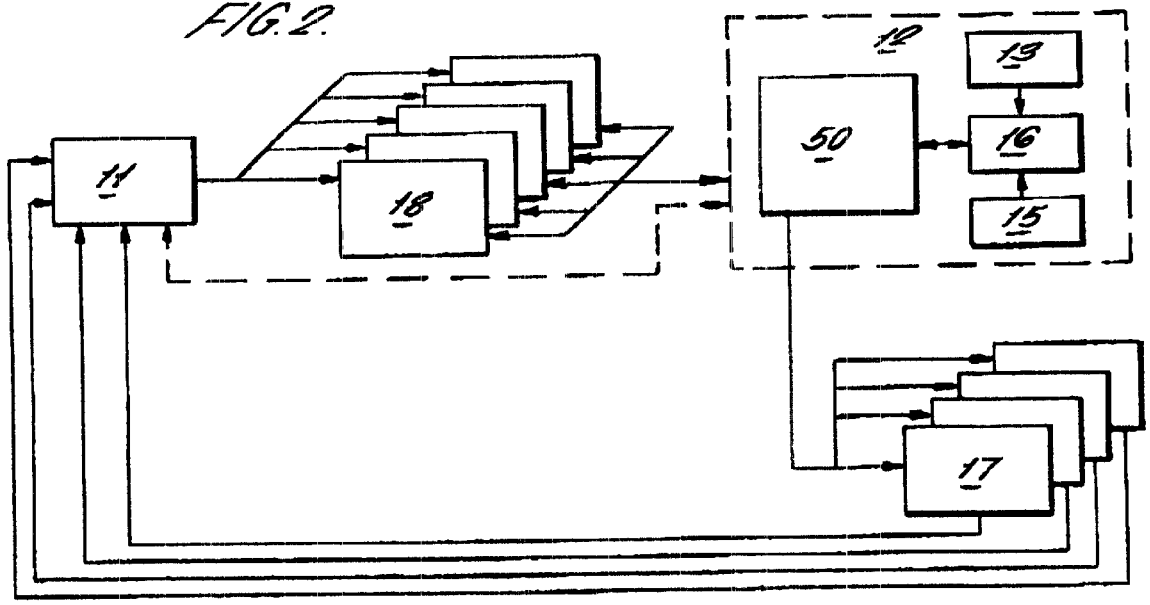
FIG. 2 shows schematically a part of an administration system according to a second embodiment of the present invention.

In FIG. 2 the retailer (or other purchaser of sound recordings, e.g. broadcaster or juke box company) uses the computer apparatus 11 to access via the telecommunications network a plurality of different websites of different independent record labels held on a plurality of different servers 18. Each record label offers for sale on its website a plurality of products. The record labels share common shopping cart and financial clearance system 50. In the illustrated example the shopping cart and financial clearance system 50 is incorporated in the computerised administration system 12, but could be separate and linked to the computerised administration system 12. The retailer is able to visit a number of different websites and have a single shopping cart to make purchases off of all of them. The retailer then makes a single electronic payment for all of the purchased products through the system 50. The shopping cart and clearance system 50 is linked to the database 16 of agreements and thus at the end of the transaction can relay orders for products to computer apparatus 17 of suppliers licensed by the independent record labels and can also relay payments to suppliers (and possibly royalties to the independent record labels). The suppliers then supply to the retailer, in the example by sending digital files via the telecommunications apparatus from the computer apparatus 17 to the computer apparatus 11.

Above the method of the invention has been described with its application in the music industry and how it can assist independent record labels. However, it is envisaged by the applicant that the method could also be applicable in other industries. For instance, the method could be used to assist independent publishers or other industries, sport, TV production, film production, magazine advertising, printed publishing. Independent publishers might syndicate journalistic articles and the method could be used in such a way that the computer database records standard agreements for syndication, links to master copies of text and the computer database could be accessed by publishers of newspapers and magazines or books who may wish to incorporate some previously published text in their own publication. They would be able to search the database to determine who owns the rights in the text and who could license them to use the text. Retailers of printed publications could also use the database in the manner described above in relation to musical recordings. Perhaps the independent publishing houses will allow one supplier to supply books and printed matter and another supplier to supply the content electronically and perhaps another supplier to sell merchandise associated with for instance, a series of books. All of this information could be recorded in the computer database and accessed thereafter.

The method of the present invention has the further benefit that it can provide as a part of the method a complete record of agreements for the independent record labels (or similar). Thus, independent record labels, which will be short of funding, will not have to establish themselves their own electronic records. All that the independent record labels will have to do is to inform the database when there is any new release of a musical track so that the musical track is recorded in the database. Also, details of any agreements concluded will have to be recorded in the database, were this not done automatically by selection of renegotiated agreements.

It is envisaged that one community of, for instance, independent record labels situated in a particular territorial location could operate with one computer database, but this computer database could contain links to computer databases owned by associations of independent record labels in other communities. Thus, if a retailer enquires of a particular computer database of the supplier of the product relating to a certain independent record label and the label is not party to the association which runs the database then the retailer will be redirected to another computer database of a different collective.

Figure 3:
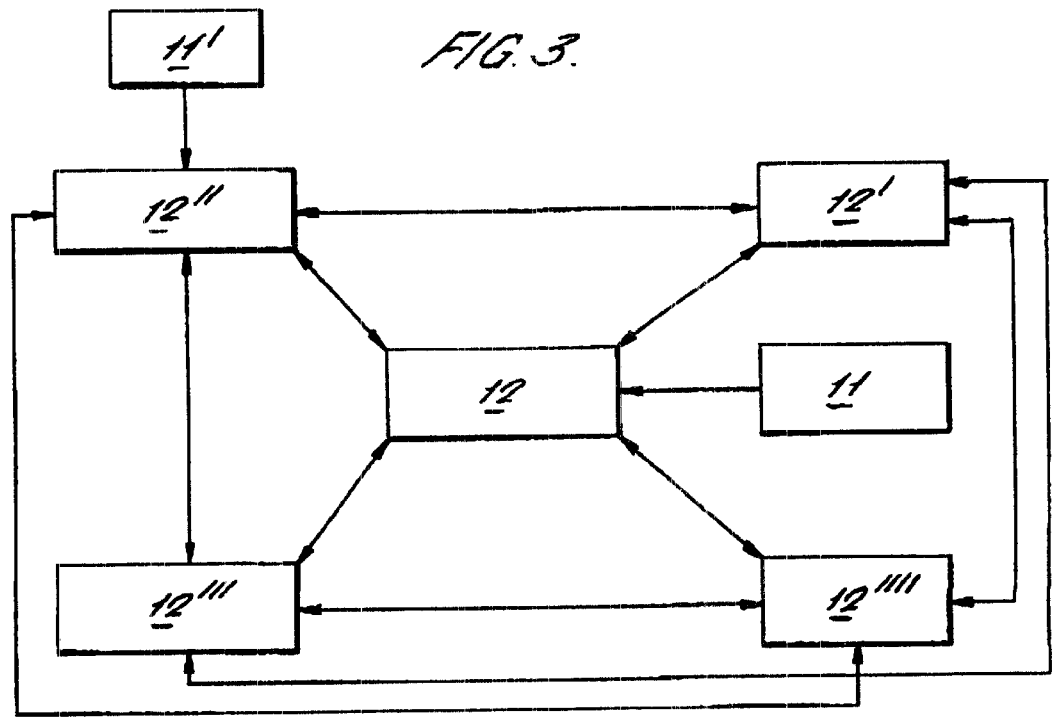
FIG. 3 shows schematically a part of an administration system according to a third embodiment of the present invention.

FIG. 3 shows a first arrangement whereby the system could work. For the sake of simplicity the diagram does not show the computer apparatus 10, 15, 17 and 18 of FIG. 1, but these will be connected to the apparatus 11 and 12 as shown in FIG. 1. In FIG. 3 a retailer uses a computer apparatus 11 to access an administration computer system 12 operated on behalf of a first community of independent record labels. The system 12 on checking its database discovers that it does not have responsibility for a musical track requested by the retailer and therefore redirects the retailer via the telecommunications network to a computerised administration system 12" of a different community of independent record labels. The figure shows a plurality of computerised administration systems 12, 12', 12", 12'" and 12"" of a plurality of different communities of record labels all interconnected and referring business to each other (e.g. a broadcaster 11' seeks to order via the system 12" only to be referred on to the system 12).

Figure 4:
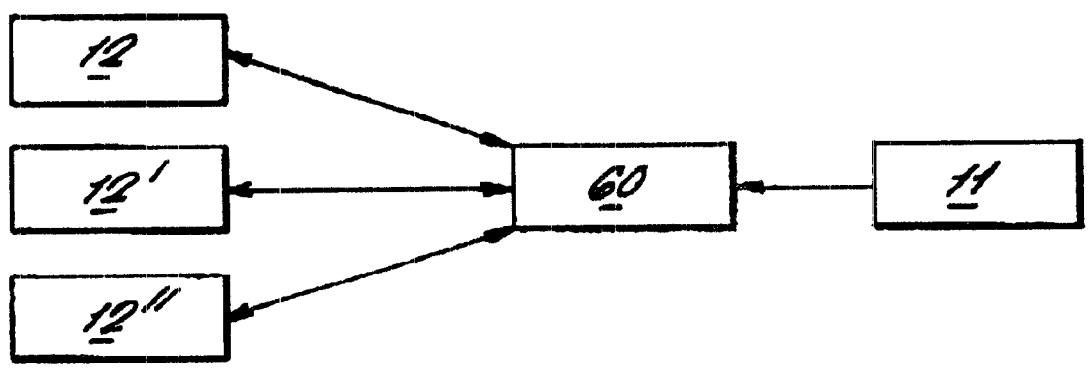
FIG. 4 shows schematically a part of an administration system according to a fourth embodiment of the present invention.

FIG. 4 shows a second arrangement whereby a plurality of communities of record labels are interconnected together. In this arrangement a hub system 60 is interconnected between the computerised administration systems 12, 12' and 12" of a plurality of different communities of independent record labels. For the sake of simplicity the computer apparatus 10, 15, 17 and 18 is omitted but will be connected as shown in FIG. 1. The retailer 11 accesses first a website in a hub system 60 to be directed to an administration system 12, 12', 12" appropriate for the sound recording(s) requested. Each community of independent record labels will hold its own data. The infrastructure supplying the different computerised administration systems 12, 12', 12" could be common shared infrastructure with each community owning its own data in the infrastructure (this applies equally to the FIG. 3 arrangement).

The independent record labels and independent publishers mentioned above are given as examples of holders of intellectual property rights. The holders can also include original creators of the recordings of sound and/or images and/or text and can also include a company or individual licensed by the original creator or working on behalf of the original creator.

Whilst in the examples given above a retailer sources and delivers a musical recording only after receiving an order from a consumer, it is envisaged that the retailer could use the system of the invention to locate product which is purchased and placed in the retailer's stock for later sale to a consumer. For instance, a compact disk could be sourced and then stored in a shop or warehouse or a digital file downloaded to a store held by the retailer on a server of the retailer.

What is claimed is:

1. A method of enabling and administering commercial transactions using a computerised administration system, the method comprising the steps of:

storing in a first computer database of the computerised administration system records of a plurality of recordings of sounds and/or images and/or text together with records of a plurality of holders of intellectual property rights in or related to the recordings;

storing in a second computer database of the computerised administration system records of agreements concluded between the holders of the intellectual property rights and a plurality of suppliers licensed under the intellectual property rights, the suppliers producing a variety of different types of products deliverable to customers under the agreements;

making first and second the computer databases accessible via a telecommunications network to prospective purchasers of the products of the suppliers; and enabling the purchasers to search the first and second computer databases to locate for each recording which supplier can produce each type of product licensed by the relevant holder of intellectual property rights.

2. A method as claimed in claim 1 wherein:

the purchasers are retailers of the products who sell the products to the consumers; and on receipt of an order from a consumer for a product, each retailer accesses the first and second computer databases to determine which supplier can supply the product and then orders the product from the supplier.

3. A method as claimed in claim 2, wherein the supplier delivers the ordered product directly to the consumer.

4. A method as claimed in claim 1 wherein:

an administrator operates the computerised administration system on behalf of the plurality of holders of intellectual property rights;

the administrator on behalf of all of the holders of intellectual property rights negotiates terms and conditions of a plurality of agreements with a plurality of the suppliers; and the administrator records the terms and conditions of the negotiated agreements in a third computer database of the computerised administration system accessible to the holders of the intellectual property rights whereby the holders of the intellectual property rights can review the terms and conditions and then select to enter into agreements with one or more of the plurality of suppliers on the previously negotiated terms and conditions.

5. A method as claimed in claim 4 wherein:

the holders of the intellectual property rights select to enter into the agreements with previously negotiated terms and conditions by communicating electronically with the computerised administration system; and records of the selected agreements are automatically stored in the second computer database following the selection thereof.

6. A method as claimed in claim 1, wherein:

the computerised administration system receives from the purchasers and/or the suppliers information concerning the number of products ordered by each purchaser from each supplier; and the computerised administration system records a history of purchases of products.

7. A method as claimed in claim 1 comprising additionally the steps of:

storing in the second computer database records of purchasing arrangements agreed between the purchasers and the suppliers and/or the holders of the intellectual property rights; and making available the records of purchasing arrangements to the suppliers and/or the holders of the intellectual property rights to facilitate correct calculation of payments.

8. A method as claimed in claim 1 wherein:

the recordings are recordings of music and comprise a plurality of musical tracks; and in respect of each musical track or in respect of each specified grouping of musical tracks, the first computer database records identification information and the second computer database records which recorded agreements are relevant to the musical track.

9. A method as claimed in claim 1 comprising additionally the steps of:

hosting on an administration server of the computerised administration system a site which allows access via the telecommunications network to the first and second computer databases;

the purchasers using computer apparatus remote from the administration server to communicate with the administration server via the telecommunications network;

the suppliers using computer apparatus remote from the administration server to communicate with the administration server via the telecommunications network; and the holders of the intellectual property rights using computer apparatus remote from the administration server to communicate with the administration server via the telecommunications network.

10. A method as claimed in claim 9 comprising additionally the steps of:

recording in the second computer database links from the administration server to the computer apparatus of the suppliers;

the suppliers hosting on the computer apparatus thereof sites which facilitate purchase of the products sold thereby; and the administration server linking the computer apparatus of a purchaser via the telecommunications network to the computer apparatus of a relevant supplier when the purchaser has located the relevant supplier via the second computer database.

11. A method as claimed in claim 9 comprising additionally the steps of:

a purchaser ordering a plurality of different products by asking the computer apparatus thereof to make a bulk electronic request of the computerised administration system for information regarding the relevant suppliers;

the computer administration system selecting relevant suppliers; and the administration server connecting the computer apparatus of the purchaser to the computer apparatus of the selected relevant suppliers.

12. A method as claimed in claim 9 comprising additionally:

maintaining a master copy of each recording on computer apparatus remote from the administration server;

recording in the first computer database links to the master copies of the recordings; and making the links to the master recording accessible to the suppliers.

13. A method as claimed in claim 1 wherein at least one of the suppliers supplies products which are digital files containing the recordings.

14. A method as claimed in claim 1 wherein at least one of the suppliers supplies products which are recordings on compact disks.

15. A method as claimed in claim 1 comprising additionally the step of:

the purchasers paying the suppliers by payments made electronically via the telecommunications network.

16. A method as claimed in claim 15 comprising additionally the step of:

the suppliers paying the holders of the intellectual property rights or their agents by payments made electronically via the telecommunications network.

17. A method as claimed in claim 15 comprising additionally the step of:

the computerised administration system processing centrally all electronic payments on behalf of all of the suppliers and/or the holders of intellectual property rights.

18. A computerised administration system for administering the method claimed in claim 1, the computerised administration system comprising:

computer apparatus hosting the first computer database which stores the records of the plurality of recordings and the second computer database which stores records of the agreements; and communications means which allows the computer apparatus to be linked via a telecommunications network with client computer apparatus to enable each purchaser to access and search the first and second computer databases via the telecommunications network.

19. An administration system as claimed in claim 18 comprising additionally:

communications means which enables each holder of intellectual property rights to access the second computer database via the telecommunications network.

20. Use of computer apparatus in the method of claim 1 to host the first computer database which stores the second computer database which stores the records of the plurality of recordings and the records of agreements.

21. Use of computer apparatus in the method of claim 1 to access via the telecommunications network the first computer database which stores the records of the plurality of recordings and the second computer database which stores the records of the agreements.

22. A method of enabling and administering commercial transactions using a computerised administration system, the method comprising the steps of:

a plurality of holders of Intellectual Property rights in a plurality of recordings of sounds and/or images and/or text offering the recordings for sale on sites hosted on a plurality of host computer apparatus and publicly accessible from a telecommunications network;

a purchaser using client computer apparatus to order electronically via the telecommunications network recordings from the plurality of different sites of the holders of Intellectual Property rights;

each host computer apparatus relaying details regarding the orders of the purchaser to a payment administration system common to all the publicly accessible sites and contained in the computerised administration system;

the purchaser making a single electronic payment via the telecommunications network to the payment administration system in respect of orders made placed by the purchaser at a plurality of different publicly accessible sites;

storing in a first computer database of the computerised administration system records of the plurality of recordings of sounds and/or images and/or text offered for sale by the holders of the Intellectual Property rights holders;

storing in a second computer database of the computerised administration system records of agreements concluded between the holders of the Intellectual Property rights and a plurality of suppliers licensed under the Intellectual Property rights; and the computerised administration system using the first and second databases thereof to determine from the orders placed by the purchaser which suppliers are authorised to supply the requested recordings and to relay electronically via the telecommunications network the orders to the relevant suppliers along with payment for the orders.

* * * * *